United States Patent
Gou et al.

(10) Patent No.: US 8,582,487 B2
(45) Date of Patent: Nov. 12, 2013

(54) METHOD AND SYSTEM FOR TRANSMITTING A MULTIMEDIA BROADCAST MULTICAST SERVICE CONTROL SIGNALING

(75) Inventors: Wei Gou, Shenzhen (CN); Zijiang Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 143 days.

(21) Appl. No.: 13/202,745

(22) PCT Filed: Mar. 25, 2010

(86) PCT No.: PCT/CN2010/071324
§ 371 (c)(1),
(2), (4) Date: Aug. 22, 2011

(87) PCT Pub. No.: WO2010/111925
PCT Pub. Date: Oct. 7, 2010

(65) Prior Publication Data
US 2011/0305186 A1    Dec. 15, 2011

(30) Foreign Application Priority Data

Apr. 3, 2009 (CN) .......................... 2009 1 0081165

(51) Int. Cl.
*H04H 20/71* (2008.01)
(52) U.S. Cl.
USPC ........................................................ 370/312
(58) Field of Classification Search
USPC ........................................................ 370/312
See application file for complete search history.

(56) References Cited

U.S. PATENT DOCUMENTS

2006/0256807 A1* 11/2006 Jung et al. ..................... 370/432
2008/0081598 A1*  4/2008 Chandra et al. ............. 455/414.1
(Continued)

FOREIGN PATENT DOCUMENTS

CN   101262626 A   9/2009
JP   2007522758 A  8/2007
(Continued)

OTHER PUBLICATIONS

Supplementary European Search Report in European application No. 10758027.6, mailed on Jun. 13, 2012.

(Continued)

*Primary Examiner* — Chirag Shah
*Assistant Examiner* — Amar Persaud
(74) *Attorney, Agent, or Firm* — Oppedahl Patent Law Firm LLC

(57) ABSTRACT

The present invention discloses a method for transmitting a Multimedia Broadcast Multicast Service (MBMS) control signaling, comprising: a network side sends the indication information of a radio frame and/or a sub-frame carrying an MBMS control channel to a terminal via a high-level signaling and sends an MBMS control signaling to the terminal via the radio frame and/or the sub-frame carrying an MBMS control channel; and the terminal acquires the radio frame and/or the sub-frame carrying an MBMS control channel through analysis according to the acquired indication information of the radio frame and/or the sub-frame and reads the MBMS control signaling from the radio frame and/or the sub-frame. The present invention further discloses a system for transmitting an MBMS control signaling, which realizes the configuration of an MBMS control channel at a system side, provides a method for the transmission of an MBMS control signaling, and eliminates the randomness in the transmission of an MBMS control signaling at a system side signaling and the reception of an MBMS control signaling at a terminal at a low signaling overhead.

18 Claims, 3 Drawing Sheets

(56) References Cited

U.S. PATENT DOCUMENTS

| | | | | |
|---|---|---|---|---|
| 2009/0323574 | A1* | 12/2009 | Koskinen et al. | 370/312 |
| 2010/0061285 | A1* | 3/2010 | Maeda et al. | 370/312 |
| 2010/0124184 | A1* | 5/2010 | Dayal et al. | 370/280 |
| 2010/0157919 | A1* | 6/2010 | Koskinen | 370/329 |
| 2010/0165901 | A1* | 7/2010 | Kim | 370/312 |
| 2010/0325504 | A1* | 12/2010 | Lee et al. | 714/748 |

FOREIGN PATENT DOCUMENTS

| | | |
|---|---|---|
| JP | 2007522776 A | 8/2007 |
| JP | 2008535311 A | 8/2008 |
| JP | 2008535364 A | 8/2008 |
| JP | 2010530662 A | 9/2010 |
| WO | 2008024214 A2 | 2/2008 |
| WO | 2008042225 A2 | 4/2008 |
| WO | 2008151069 A1 | 12/2008 |

OTHER PUBLICATIONS

REL-9 MBMS solution Mar. 17, 2009.

eMBMS in Rel9 Mar. 17, 2009.

Relieving redundant bits of radioframeAllocationOffset for future use Nov. 10-14, 2008.

Fixing radio-frame over-allocation for MBSFN Sep. 30-Oct. 3, 2008.

International Search Report in international application No. PCT/CN2010/071324, mailed on May 13, 2010.

English Translation of the Written Opinion of the International Search Authority in international application No. PCT/CN2010/071324, mailed on May 13, 2010.

MBMS baseline for Rel-9 Mar. 23, 2009.

\* cited by examiner

METHOD AND SYSTEM FOR TRANSMITTING A MULTIMEDIA BROADCAST MULTICAST SERVICE CONTROL SIGNALING

TECHNICAL FIELD

The present invention relates to a broadcast transmission technology used in Long Term Evolution (LTE) systems, and in particular to a method and system for transmitting a Multimedia Broadcast Multicast Service (MBMS) control signaling.

BACKGROUND

With the rapid development of Internet, there have emerged a great number of mobile data multimedia services and various high-bandwidth multimedia services, such as video conference, TV broadcast, video on demand, advertisements, online education, interactive games and the like. These services meet the increasing demands of mobile subscribers on services and bring a new growth point to the business of mobile operators. Compared with common data services, these mobile data multimedia services require multiple subscribers to receive same data at the same time and are characterized by high data volume, long duration, sensitivity to time delay and so on.

In order to use mobile network resources effectively, the 3rd Generation Partnership Project (3GPP) has proposed a Multimedia Broadcast Multicast Service (MBMS) which is a technology for transmitting data from one data source to multiple targets that realizes the share of network (including a core network and an access network) resources, and improves the utilization ratio of network resources, especially the utilization ratio of air interface resources. The MBMS defined by 3GPP is capable of not only realizing multicast and broadcast of full-text low-speed messages but also realizing multicast and broadcast of high-speed multimedia services and providing abundant multimedia services including video and audio.

In a Long Term Evolution (LTE) system, an MBMS can be sent in a hybrid carrier manner, which means that a Unicast service and an MBMS are sent on the same carrier in the manner of time division multiplexing, wherein a sub-frame is the smallest unit of time division multiplexing. A radio frame adopted in the current LTE for carrying an MBMS meets the following relation:

$$\text{SFN mod radioFrameAllocationPeriod} = \text{radioFrameAllocationOffset}$$

wherein as the maximum System Frame Number (SFN, that is number of a radio frame defined in the system) in the LTE is specified as 1023, SFNs are ranged from 0 to 1023; the radioFrameAllocationPeriod represents an MBMS single Frequency Network (MBSFN) radio frame period and is valued to be any of $\{1, 2, 4, 8, 16, 32\}$; the radioFrameAllocationOffset represents an MBSFN radio frame offset and is valued to be an integer that is greater than or equal to 0 but smaller than a selected value of an MBSFN radio frame period; and the mod represents a modulus operation of SFN to radioFrameAllocationPeriod. The information on the relation met by a radio frame of an MBMS is sent at System Information Block Type 2 (SIB2) of a system message to a terminal. According to the relation above, if the value of the radioFrameAllocationPeriod is 2 and radioFrameAllocationOffset=0, then MBSFN radio frames are obtained as shown in FIG. 1, wherein shadow areas represent system-configured MBSFN radio frames which are radio frames for carrying an MBMS. Furthermore, the system may configure a sub-frame for carrying an MBMS within an MBSFN radio frame, such sub-frame is referred to as an MBSFN sub-frame. The MBSFN frames and MBSFN sub-frames are both referred to as MBSFN resources, and such MBSFN resources form a Multicast Channel (MCH) transmission channel.

It is specified in the disclosed LTE technologies that when a hierarchical architecture is adopted, a Multicast Control Channel (MCCH) of an MBMS is divided into the following two types: a Primary MCCH (P-MCCH) for carrying a primary multicast control signaling and a Secondary MCCH (S-MCCH) for carrying a secondary multicast control signaling; when no hierarchical architecture is adopted, a control channel of an MBMS is referred to as an MCCH and is used for carrying a control signaling of the MBMS. It is also prescribed in the disclosed LTE technologies that scheduling information of one or two P-MCCHs can be indicated in a system broadcast message (BCCH, Broadcast Control Channel), wherein the scheduling information of one P-MCCH is transmitted on a Downlink Shared Channel (DL-SCH) in a single-cell mode, and the scheduling information of the other P-MCCH is transmitted on an MCH in a multi-cell mode. A control signaling related to services in an MBSFN area is carried by a P-MCCH and is used to indicate effective MBMSs in the MBSFN area and other information. If necessary, the P-MCCH can also carry indication information of an S-MCCH to facilitate the finding of the S-MCCH.

In accordance with the description on the disclosed LTE technologies, MBMSs are classified into a single-cell mode and a multi-cell mode, and P-MCCHs are also classified into a single-cell mode and a multi-cell mode. One of the main features of the single-cell mode lies in no support for combination of MBSFNs of multiple cells, while the multi-cell mode is necessarily required to be supportive to combination of MBSFNs of multiple cells. However, according to the description of the latest disclosed LTE technology, an MCCH no longer supports combination of MBSFNs or distinguish between a primary structure and a secondary structure.

It can be seen from above that both the P-MCCH and the S-MCCH sent in a multi-cell mode are required to be carried on multicast resources composed of multicast frames. If MCCHs are neither divided into primary and secondary structures nor sent in a multi-cell mode, then the MCCHs can be carried on unicast resources (namely, a DL-SCH) or multicast resources (namely, an MCH) composed of multi-cast frames.

For any case above, no uniform standard for transmitting a P-MCCH, an S-MCCH or an MCCH has been provided in prior art, thus leading to an extremely random transmission at a system side. In other words, it is necessary for a terminal to make frequent tries in order to receive above-mentioned MBMS control channel (including said P-MCCH, S-MCCH, MCCH), which may cause a terminal to receive randomly, bring higher signaling overheads, and go against power saving of the terminal.

SUMMARY

In view of this, the main objective of the present invention is to provide a method and system for transmitting an MBMS control signaling to eliminate the randomness in the transmission of an MBMS control signaling at a system side and the reception of an MBMS control signaling at a terminal, and lower the signaling overhead of the terminal.

In order to achieve the purpose above, the technical scheme of the present invention is realized as follows.

The present invention provides a method for transmitting an MBMS control signaling, comprising:

sending indication information of a radio frame and/or a sub-frame carrying an MBMS control channel to a terminal via a high-level signaling and sending an MBMS control signaling to the terminal via the radio frame and/or the sub-frame carrying an MBMS control channel by a network side;

acquiring the radio frame and/or the sub-frame carrying an MBMS control channel through analysis according to the acquired indication information of the radio frame and/or the sub-frame and reading the MBMS control signaling from the radio frame and/or the sub-frame by a terminal.

The MBMS control channel may be a Multicast Control Channel (MCCH), a Primary Multicast Control Channel (P-MCCH), a Secondary Multicast Control Channel (S-MCCH), a Multicast Indicator Channel (MICH), or a Multicast Traffic Channel (MTCH).

The indication information of the radio frame and/or the sub-frame carrying an MBMS control channel may comprise at least one of:

occurrence period information and sending offset information of the radio frame and/or the sub-frame carrying an MBMS control channel;

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel further comprises: an MBSFN radio frame period and an MBSFN radio frame offset.

The acquiring the radio frame carrying an MBMS control channel through analysis according to the indication information of the radio frame may specifically comprise:

acquiring the radio frame carrying an MBMS control channel through analysis according to the conversion relations of SFN mod PmcchPeriod=PmcchOffset and SFN mod radioFrameAllocationPeriod=radioFrameAllocationOffset; wherein the SFN represents a system frame number and is valued to be a positive integer; the radioFrameAllocationPeriod represents the MBSFN radio frame period; the radioFrameAllocationOffset represents the MBSFN radio frame offset and is valued to be an integer that is greater than or equal to 0 but smaller than a value of the radioFrameAllocationPeriod; the PmcchPeriod represents the occurrence period information of the radio frame and/or the sub-frame carrying an MBMS control channel and is valued to be an integer that is greater than or equal to the radioFrameAllocationPeriod; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel refers to a radio frame corresponding to an SFN meeting the conversion relation of SFN mod PmcchPeriod=PmcchOffset or synchronously meeting the two aforementioned conversion relations.

The method may further comprise at least one of the following steps that:

implicitly notifying, by the network side, the terminal of the sending offset via the MBSFN radio frame offset according to a preset correspondence between the sending offset and the MBSFN radio frame offset;

implicitly notifying, by the network side, the terminal of the repetition period via the MBSFN radio frame period according to a preset correspondence between the repetition period and the MBSFN radio frame period;

implicitly notifying, by the network side, the terminal of the modification period via the repetition period according to a preset correspondence between the repetition period and the modification period;

and implicitly notifying, by the network side, the terminal of the repetition period via the modification period according to a preset correspondence between the repetition period and the modification period.

The sending indication information of a radio frame and/or a sub-frame carrying an MBMS control channel to a terminal by a network side via a high-level signaling is:

based on notifying the terminal of information of the radio frame carrying an MBMS control channel via a high-level signaling, the network side further indicates information of a sub-frame which specifically carries the MBMS control channel in the radio frame carrying the MBMS control channel to the terminal in a bitmap manner, a sub-frame number indication manner or a sub-frame fixation manner via the high-level signaling.

The high-level signaling may be a system broadcast message, a Radio Resource Control (RRC) message or a dedicated signaling.

The present invention further provides a method for transmitting an MBMS control signaling, comprising:

sending indication information of a radio frame and/or a sub-frame carrying an MBMS control channel to a terminal via a high-level signaling and sending an MBMS control signaling to the terminal via the radio frame and/or the sub-frame carrying an MBMS control channel by a network side.

The MBMS control channel may be an MCCH, a P-MCCH, an S-MCCH, an MICH or an MTCH.

The indication information of the radio frame and/or the sub-frame carrying an MBMS control channel may comprise at least one of:

occurrence period information and sending offset information of the radio frame and/or the sub-frame carrying an MBMS control channel;

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel may further comprise: an MBSFN radio frame period and an MBSFN radio frame offset.

The method may further comprise at least one of the following steps that:

implicitly notifying, by the network side, the terminal of the sending offset via the MBSFN radio frame offset according to a preset correspondence between the sending offset and the MBSFN radio frame offset;

implicitly notifying, by the network side, the terminal of the repetition period via the MBSFN radio frame period according to a preset correspondence between the repetition period and the MBSFN radio frame period;

implicitly notifying, by the network side, the terminal of the modification period via the repetition period according to a preset correspondence between the repetition period and the modification period;

implicitly notifying, by the network side, the terminal of the repetition period via the modification period according to a preset correspondence between the repetition period and the modification period.

The sending indication information of a radio frame and/or a sub-frame carrying an MBMS control channel to a terminal through a high-level signaling may be:

based on notifying the terminal of information of the radio frame carrying an MBMS control channel via a high-level signaling, the network side further indicates information of a sub-frame which specifically carries the MBMS control channel in the radio frame carrying the MBMS control channel to the terminal in a bitmap manner, a sub-frames number indication manner or a sub-frame fixation manner via the high-level signaling.

The high-level signaling may be a system broadcast message, an RRC message, or a dedicated signaling.

The present invention further provides a method for transmitting an MBMS control signaling, comprising:

acquiring indication information of a radio frame and/or a sub-frame carrying an MBMS control channel from a network side by a terminal via a high-level signaling;

acquiring the radio frame and/or the sub-frame carrying an MBMS control channel through analysis according to the acquired indication information of the radio frame and/or the sub-frame and reading an MBMS control signaling from the radio frame and/or the sub-frame by the terminal.

The MBMS control channel may be an MCCH, a P-MCCH, an S-MCCH, an MICH or an MTCH.

The indication information of the radio frame and/or the sub-frame carrying an MBMS control channel may comprise at least one of:

occurrence period information and sending offset information of the radio frame and/or the sub-frame carrying an MBMS control channel;

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel may further comprise: an MBSFN radio frame period and an MBSFN radio frame offset.

The acquiring the radio frame carrying an MBMS control channel through analysis according to the indication information of the radio frame may specifically comprise:

acquiring the radio frame carrying an MBMS control channel through analysis according to the conversion relations of SFN mod PmcchPeriod=PmcchOffset and SFN mod radioFrameAllocationPeriod=radioFrameAllocationOffset; wherein the SFN represents a system frame number and is valued to be a positive integer; the radioFrameAllocationPeriod represents the MBSFN radio frame period; the radioFrameAllocationOffset represents the MBSFN radio frame offset and is valued to be an integer that is greater than or equal to 0 but smaller than a value of the radioFrameAllocationPeriod; the PmcchPeriod represents the occurrence period information of the radio frame and/or the sub-frame carrying an MBMS control channel and is valued to be an integer that is greater than or equal to the radioFrameAllocationPeriod; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel is a radio frame corresponding to an SFN meeting the conversion relation of SFN mod PmcchPeriod=PmcchOffset or synchronously meeting the two aforementioned conversion relations.

The high-level signaling may be a system broadcast message, an RRC message, or a dedicated signaling.

The present invention further provides a system for transmitting an MBMS control signaling, comprising a network side and a terminal which are connected with each other, wherein the network side is used for sending indication information of a radio frame and/or a sub-frame carrying an MBMS control channel to a terminal via a high-level signaling and sending an MBMS control signaling to the terminal via the radio frame and/or the sub-frame carrying an MBMS control channel;

the terminal is used for acquiring the radio frame and/or the sub-frame carrying an MBMS control channel through analysis according to the acquired indication information of the radio frame and/or the sub-frame and reading the MBMS control signaling from the radio frame and/or the sub-frame.

The MBMS control channel may be an MCCH, a P-MCCH, an S-MCCH, an MICH or an MTCH.

The indication information of the radio frame and/or the sub-frame carrying an MBMS control channel may comprise at least one of:

occurrence period information and sending offset information of the radio frame and/or the sub-frame carrying an MBMS control channel;

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel may further comprise: an MBSFN radio frame period and an MBSFN radio frame offset.

With the method and system for transmitting a MBMS control signaling in which a network side sends indication information of a radio frame and/or a sub-frame carrying an MBMS control channel to a terminal via a high-level signaling, and the terminal acquires the radio frame and/or the sub-frame carrying an MBMS control channel through analysis according to the acquired indication information of the radio frame and/or the sub-frame and reads an MBMS control signaling from the radio frame and/or the sub-frame, the present invention resolves the problem about configuration of an MBMS control channel at a system side and provides a method for transmitting an MBMS control signaling, thereby eliminating the randomness in the transmission of an MBMS control signaling at a system side and the reception of an MBMS control signaling at a terminal at a small signaling overhead and facilitates the power saving of the terminal; furthermore, the indication information of the radio frame and/or the sub-frame carrying an MBMS control channel can be flexibly configured, making the transmission of an MBMS control signaling at a network side flexible, moreover, a sub-frame carrying an MBMS control channel can be flexibly selected, facilitating the scheduling at a network side.

DETAILED DESCRIPTION

The technical scheme of the present invention is further illustrated below in detail by reference to drawings and specific embodiments.

Figure 1:
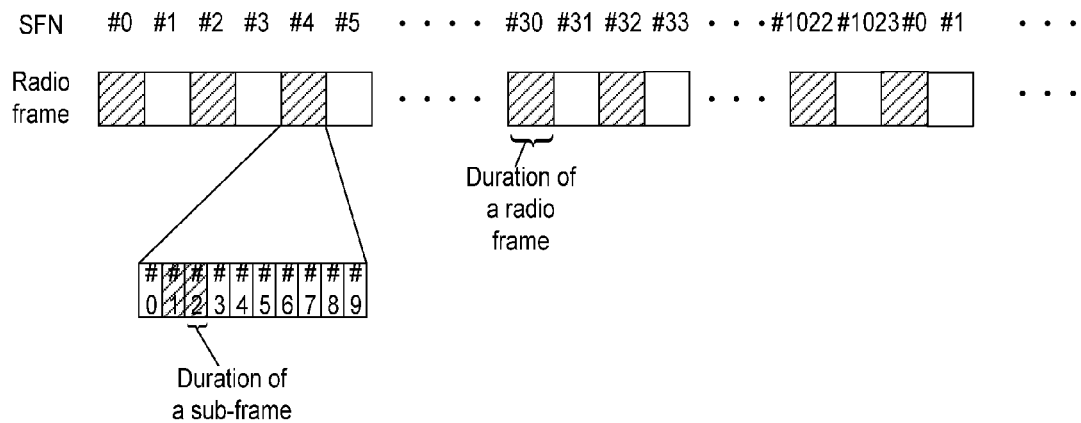
FIG. 1 is a schematic diagram illustrating the configuration of MBSFN radio frames in prior art.
Figure 2:
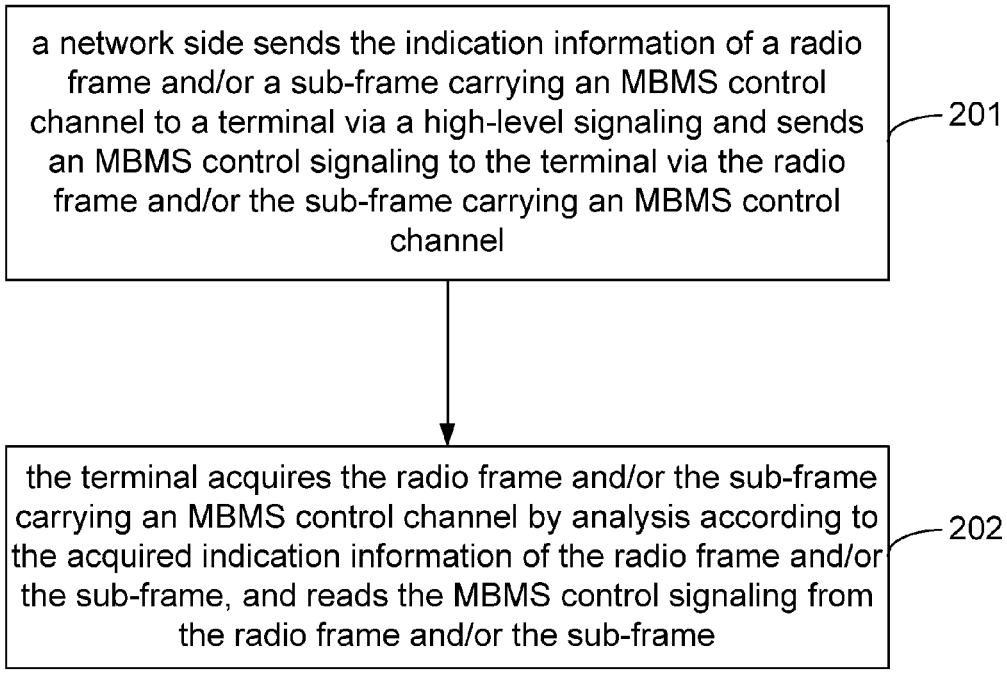
FIG. 2 is a flow chart of a method for transmitting an MBMS control signaling according to the present invention.

As shown in FIG. 2, a method provided in the present invention for transmitting an MBMS control signaling comprises:

201: a network side sends indication information of a radio frame and/or a sub-frame carrying an MBMS control channel to a terminal via a high-level signaling and sends an MBMS control signaling to the terminal via the radio frame and/or sub-frame carrying an MBMS control channel.

The network side mentioned in the present invention may be a base station (eNB), a Mobility Management Entity (MME), a Gate-way, an Evolved Packet System (EPS), or a Multi-cell/Multicast Coordination Entity (MCE) and the like. The following description is given by taking an eNB as an example.

The MBMS control channel mentioned in the present invention may be a P-MCCH, an S-MCCH or an MCCH described in the disclosed LTE technologies, or a Multicast Indicator Channel (MICH), or other channels such as a Multicast Traffic Channel (MTCH) and the like. Definitely, the MBMS control channel of the present invention is not limited to the mentioned above and its type can be extended as needed.

In the present invention, sending indication information of a radio frame and/or a sub-frame carrying an MBMS control channel to a terminal by an eNB via a high-level signaling is specifically as follows: the eNB can only point out a radio frame carrying an MBMS control channel to the terminal, for those sub-frames in the radio frame carrying an MBMS control channel, they can be fixed sub-frames that are predetermined through a negotiation between the eNB and the terminal, or the terminal performs a blind detection on all the sub-frames in the radio frame carrying an MBMS control channel, therefore the eNB only need to send indication information of the radio frame carrying an MBMS control channel to the terminal; or the eNB can only point out a sub-frame carrying an MBMS control channel to the terminal, for the radio frame carrying the MBMS control channel, it can be a fixed radio frame that is predetermined through a negotiation between the eNB and the terminal, or the terminal performs a blind detection on the fixed sub-frames within each radio frame, therefore the eNB only needs to send indication information of the sub-frame carrying the MBMS control channel to the terminal; or the eNB can synchronously point out a radio frame and a sub-frame carrying an MBMS control channel to the terminal, in this case the eNB needs to send indication information of the radio frame and the sub-frame carrying the MBMS control channel to the terminal.

In the present invention, the eNB when notifying indication information of a sub-frame, can indicate the sub-frame which specifically carries an MBMS control channel in the radio frame carrying the MBMS control channel to the terminal.

Besides, the indication information of the radio frame and/or the sub-frame carrying an MBMS control channel comprises at least one of:

the occurrence period information and the sending offset information of the radio frame and/or the sub-frame carrying an MBMS control channel; the sending offset information of the control signaling carried on the radio frame and/or the sub-frame of the MBMS control channel; and the repetition period information and the modification period information of the control signaling carried on the radio frame and/or the sub-frame of the MBMS control channel;

the indication information of the radio frame and/or the sub-frame carrying an MBMS control channel further comprises: an MBSFN radio frame period and an MBSFN radio frame offset.

In the present invention, the radio frame and/or the sub-frame carrying an MBMS control channel sent by the eNB to the terminal may be an MBSFN radio frame or sub-frame resource, or may also be a unicast frame or sub-frame resource.

The indication information is sent in the following two ways:

1. if the MBMS control signaling is carried on an MCH composed of multicast frames, then an MBMS control channel in an MBSFN area is carried on the MCH, i.e. on an actual MBSFN resource. For an MBSFN area, a radio frame for carrying an MBMS control channel should meet the following conversion relations:

$$SFN \bmod PmcchPeriod = PmcchOffset,$$

and SFN mod radioFrameAllocationPeriod=radioFrameAllocationOffset, wherein the SFN represents a system frame number and is valued to be 0 or a positive integer, however, as the maximum system frame number in an LTE is specified as 1023, the SFN can be an integer from 0 to 1023; the radioFrameAllocationPeriod represents an MBSFN radio frame period; the radioFrameAllocationOffset represents an MBSFN radio frame offset and is valued to be an integer that is greater than or equal to 0 but smaller than the value of the radioFrameAllocationPeriod; the PmcchPeriod represents the occurrence period of the radio frame and/or the sub-frame carrying an MBMS control channel and is valued to be an integer that is greater than or equal to the radioFrameAllocation Period; PmcchOffset represents the sending offset information of the radio frame and/or the sub-frame carrying an MBMS control channel and is valued, relative to the offset of a radio frame with SFN=0, to be 0 or a positive integer smaller than the PmcchPeriod; the mod represents a modulus operation. The radio frame carrying an MBMS control channel acquired by the terminal according to the aforementioned indication information is a radio frame corresponding to an SFN meeting the aforementioned conversion relations.

It should be noted that the occurrence period PmcchPeriod of the radio frame and/or the sub-frame carrying an MBMS control channel is the repetition period of the control signaling carried on the radio frame and/or the sub-frame of the MBMS control channel; and the sending offset PmcchOffset of the radio frame and/or the sub-frame carrying an MBMS control channel is the sending offset of the control signaling carried on the radio frame and/or the sub-frame of the MBMS control channel. Therefore, the eNB can notify the terminal of the occurrence period of the radio frame and/or the sub-frame carrying an MBMS control channel and the repetition period of the control signaling carried on the radio frame and/or the sub-frame of the MBMS control channel via the PmcchPeriod, as well as the sending offset of the radio frame and/or the sub-frame carrying an MBMS control channel and the sending offset of the control signaling carried on the radio frame and/or the sub-frame of the MBMS control channel via the PmcchOffset.

Furthermore, in the present invention, the PmcchPeriod contained in the indication information sent by the eNB can be used for describing the repetition period or the modification period of the control signaling carried on the radio frame and/or the sub-frame of the MBMS control channel. The parameter PmcchPeriod can only represent either the repetition period or the modification period in practical application, there exist the following two cases:

when the PmcchPeriod represents a repetition period, a modification period can be indirectly notified through the repetition period; a multiple relationship may be used for the indirect notification and may be fixed through a protocol or configured and then informed to the terminal; for example, it is appointed that the modification period is 4 times as long as the repetition period, and the repetition period and the modification period may start at the same location or at different locations, then when the repetition period and the modification period start at the same location, there is no need to inform the starting location of the modification period, otherwise, the starting location of the modification period should be informed; here, the sending offset represented by the PmcchOffset is the sending offset of not only the modification period but also the repetition period;

when the PmcchPeriod represents a modification period, a repetition period can be indirectly notified through the modification period; a multiple relationship may be used for the indirect notification and may be fixed through a protocol or configured and then informed to the terminal; for example, it is appointed that the repetition period is 0.25 times as long as the modification period and the repetition period and the modification period may start at the same location or different locations, then when the repetition period and the modification period start at the same location, there is no need to inform the starting location of the modification period, otherwise, the starting location of the modification period should be informed; here, the sending offset represented by the PmcchOffset is the sending offset of not only the modification period but also the repetition period.

Thus, the PmcchPeriod contained in the indication information can synchronously inform the terminal of the occurrence period information of the radio frame and/or the sub-frame carrying an MBMS control channel and the repetition period information and the modification period information of the control signaling carried on the radio frame and/or the sub-frame of the MBMS control channel; and the PmcchOffset contained in the indication information can synchronously inform the terminal of the sending offset information of the radio frame and/or the sub-frame carrying an MBMS control channel and the sending offset information of the control signaling carried on the radio frame and/or the sub-frame of the MBMS control channel.

It should be noted that there may exist an indirect multiple relationship between the PmcchPeriod and the radioFrameAllocationPeriod, that is, the network side can, based on a predetermined multiple relationship between the PmcchPeriod and the radioFrameAllocationPeriod, implicitly notify the terminal of the PmcchPeriod through the radioFrameAllocationPeriod, which saves the notification of the PmcchPeriod with a replacement of the notification of the multiple relationship which can be even saved if the multiple relationship has been specified. There may further exist an indirect multiple relationship between the PmcchOffset and the radioFrameAllocationOffset, that is, the network side can, based on a predetermined multiple relationship between the PmcchOffset and the radioFrameAllocationOffset, implicitly notify the terminal of the PmcchOffset through the radioFrameAllocationOffset, which saves the notification of the PmcchOffset with a replacement of the notification of the multiple relationship which can be even saved if the multiple relationship has been specified.

Here, when notifying indication information of a sub-frame, the eNB can indicate information of the sub-frame which specifically carries an MBMS control channel in the radio frame carrying the MBMS control channel to the terminal in a bitmap manner, a sub-frame number indication manner or a sub-frame fixation manner.

2. If the control signaling is carried on a unitcast resource, that is, on a DL-SCH, then a radio frame carrying an MBMS control channel can be a non-MBSFN radio frame, and the radio frame for carrying an MBMS control channel just need to satisfy the following conversion relation:

$$SFN \bmod PmcchPeriod = PmcchOffset,$$

wherein the SFN represents a system frame number and is valued to be 0 or a positive integer, however, as the maximum system frame number in an LTE is specified as 1023, the SFN can be valued to be an integer ranged from 0 to 1023; the PmcchPeriod represents the occurrence period information of the radio frame and/or the sub-frame carrying an MBMS control channel; the PmcchOffset represents the sending offset information of the radio frame and/or the sub-frame carrying an MBMS control channel and is valued, relative to the offset of a radio frame with SFN=0, to be 0 or a positive integer smaller than the PmcchPeriod; and the mod represents a modulus operation of SFN to PmcchPeriod. The radio frame carrying an MBMS control channel acquired by the terminal according to the indication information is a radio frame corresponding to an SFN meeting the conversion relation above.

It should be noted that the occurrence period PmcchPeriod of the radio frame and/or the sub-frame carrying an MBMS control channel is the repetition period of the control signaling carried on the radio frame and/or the sub-frame of the MBMS control channel; and the sending offset PmcchOffset of the radio frame and/or the sub-frame carrying an MBMS control channel is the sending offset of the control signaling carried on the radio frame and/or the sub-frame of the MBMS control channel. Therefore, the eNB can notify the terminal of the occurrence period of the radio frame and/or the sub-frame carrying an MBMS control channel and the repetition period of the control signaling carried on the radio frame and/or the sub-frame of the MBMS control channel via the PmcchPeriod, as well as the sending offset of the radio frame and/or the sub-frame carrying an MBMS control channel and the sending offset of the control signaling carried on the radio frame and/or the sub-frame of the MBMS control channel via the PmcchOffset.

Furthermore, in the present invention, the PmcchPeriod contained in the indication information sent by the eNB can be used for describing the repetition period or the modification period of the control signaling carried on the radio frame and/or the sub-frame of the MBMS control channel. The parameter PmcchPeriod can only represent either the repetition period or the modification period in practical application, and there exist the following two specific cases:

when the PmcchPeriod represents a repetition period, a modification period can be indirectly notified through the repetition period; the indirect notification can adopt a multiple relationship which may be fixed through a protocol or configured and then informed to the terminal; for example, it is appointed that the modification period is 4 times as long as the repetition period, and the repetition period and the modification period can start at the same location or at different locations, then when the repetition period and the modification period start at the same location, there is no need to notify the starting location of the modification period, otherwise, the starting location of the modification period should be notified; in this case, the sending offset represented by the PmcchOffset is the sending offset of not only the modification period but also the repetition period;

when the PmcchPeriod represents a modification period, a repetition period can be indirectly notified through the modification period; the indirect notification can adopt a multiple relationship which may be fixed through a protocol or configured and then informed to a terminal; for example, it is appointed that the repetition period is 0.25 times as long as the modification period, and the repetition period and the modification period may start at the same location or at different locations, then when the repetition period and the modification period start at the same location, there is no need to notify the starting location of the modification period, otherwise, the starting location of the modification period should be notified; in this case, the sending offset represented by the PmcchOffset is the sending offset of not only the modification period but also the repetition period.

Thus, the PmcchPeriod contained in the indication information can synchronously inform the terminal of the occurrence period information of the radio frame and/or the sub-frame carrying an MBMS control channel and the repetition period information and the modification period information of the control signaling carried on the radio frame and/or the sub-frame of the MBMS control channel; and the PmcchOffset contained in the indication information can synchronously inform the terminal of the sending offset information of the radio frame and/or the sub-frame carrying an MBMS control channel and the sending offset information of the control signaling carried on the radio frame and/or the sub-frame of the MBMS control channel.

Here, the eNB can indicate information of a sub-frame which specifically carries an MBMS control channel in the radio frame carrying the MBMS control channel to the terminal in a bitmap manner, a sub-frame number indication manner, or a sub-frame fixation manner.

The aforementioned high-level signaling may be a system broadcast message, or an RRC message, or a dedicated signaling.

And step 202: the terminal acquires the radio frame and/or the sub-frame carrying an MBMS control channel through analysis according to the acquired indication information of the radio frame and/or the sub-frame, and reads the MBMS control signaling from the radio frame and/or the sub-frame.

The terminal receives and analyzes the indication information according to an agreement agreed on by the terminal and the sending terminal and then receives the radio frame and/or the sub-frame carrying an MBMS control channel according to the indication information.

The operations related to the sub-frame information will be described in detail in the following embodiments.

Figure 3:
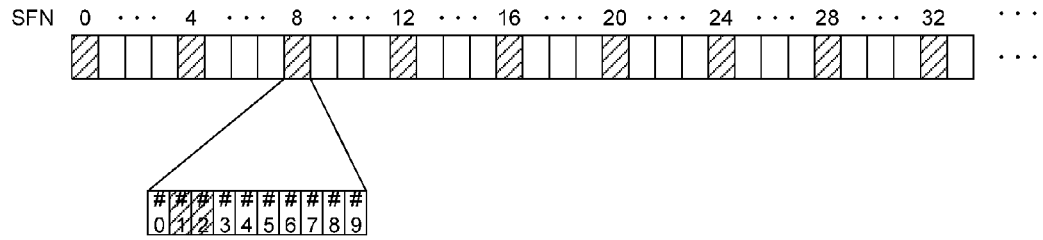
FIG. 3 is a schematic diagram illustrating radio frames for carrying an MBMS according to an embodiment of the present invention.

The method for transmitting an MBMS control signaling is described in detail below with reference to specific embodiments. To take carrying of a control signaling on an MCH as an example, provided that the duration of a radio frame is 10 ms and the radio frame includes 10 sub-frames, then the duration of a sub-frame is 1 ms. For an MBSFN area, the network side will configure corresponding radio frames for carrying an MBMS according to the MBMS traffic and other information in this area so as to send the MBMS in this area. For the sake of convenient description, it is assumed that the radio frames carrying an MBMS in an MBSFN area meet the following relation:

$$\text{SFN mod radioFrameAllocationPeriod} = \text{radioFrameAllocationOffset},$$

wherein radioFrameAllocationPeriod=4 and radioFrameAllocationOffset=0, the radioFrameAllocation Period and the radio FrameAllocationOffset are sent to the terminal via an SIB2 in a system broadcast message to acquire radio frames for carrying an MBMS as shown by the shadow areas in FIG. 3; and each radio frame carrying an MBMS includes at least one sub-frame for carrying related service data of the MBMS in a multi-cell mode.

The eNB sends radioFrameAllocationPeriod=4 and radioFrameAllocationOffset=0 to the terminal via a system broadcast message; and the terminal can acquire the radio frames carrying an MBMS (as shown by the shadow areas in FIG. 3) through analysis according to the conversion relation of SFN mod 4=0.

Figure 4:
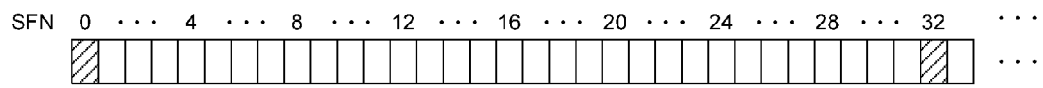
FIG. 4 is a schematic diagram 1 illustrating radio frames for carrying an MBMS control channel according to an embodiment of the present invention.

Provided that the occurrence period of the radio frames and/or the sub-frames carrying an MBMS control channel is 320 ms, if converted into the number of radio frames, that is, an MBMS control channel occurs every 32 radio frames, which corresponds to PmcchPeriod=32. The eNB carries the configured PmcchPeriod=32 and PmcchOffset=0 in a System Information Block (SIB) of a system broadcast message and sends the configured PmcchPeriod=32 and PmcchOffset=0 to the terminal, then the terminal can acquire radio frames carrying an MBMS control channel (as shown by the shadow areas in FIG. 4) through analysis according to the conversion relation of SFN mod 32=0 and determines the radio frames corresponding to SFN=0, 32, 64, 96 and the like.

Figure 5:
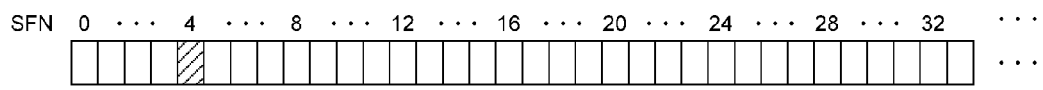
FIG. 5 is a schematic diagram 2 illustrating radio frames for carrying an MBMS control channel according to an embodiment of the present invention.

If the eNB carries the configured PmcchPeriod=32 and PmcchOffset=4 in an SIB of a system broadcast message and sends the configured PmcchPeriod=32 and PmcchOffset=4 to the terminal, then the terminal can acquire radio frames carrying an MBMS control channel (as shown by the shadow areas in FIG. 5) through analysis according to the conversion relation of SFN mod 32=4, and determines the radio frames corresponding to SFN=4, 36, 68, 100 and the like. If the parameter PmcchPeriod synchronously represents the repetition period of the MBMS control signaling carried on the radio frames and/or the sub-frames of the MBMS control channel and it is appointed that the repetition period is 4 times as long as the modification period, then the repetition period of the MBMS control signaling here is 320 ms (32 radio frames), the modification period is 1280 ms (128 radio frames), moreover, the offsets of the repetition period, the modification period and the radio frames and/or the sub-frames of the MBMS control channel relative to the radio frame with SFN=0 are all 40 ms (4 radio frames).

Figure 6:
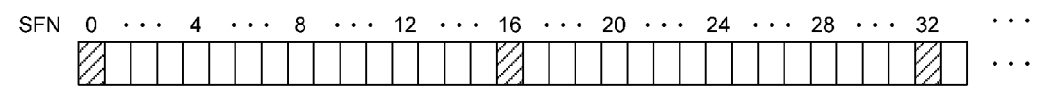
FIG. 6 is a schematic diagram 3 illustrating radio frames for carrying an MBMS control channel according to an embodiment of the present invention.

If the eNB carries the configured PmcchPeriod=16 and PmcchOffset=0 in an SIB of a system broadcast message and sends the configured PmcchPeriod=16 and PmcchOffset=0 to the terminal, then the terminal can acquire radio frames carrying an MBMS control channel (as shown by the shadow areas in FIG. 6) through analysis according to the conversion relation of SFN mod 16=0 and determines the radio frames corresponding to SFN=0, 16, 32, 48 and the like. If the parameter PmcchPeriod synchronously represents the repetition period of an MBMS control signaling carried on the radio frames and/or the sub-frames of the MBMS control channel and it is appointed that the repetition period is 4 times as long as the modification period of the MBMS control signaling, then the repetition period of the MBMS control signaling here is 160 ms (16 radio frames), the modification period is 640 ms (64 radio frames), and the offsets of the repetition period, the modification period and the radio frames and/or the sub-frames of the MBMS control channel relative to the radio frame with SFN=0 are all 0 ms (namely, there is a control channel and a control signaling on the radio frame with SFN=0).

Figure 7:
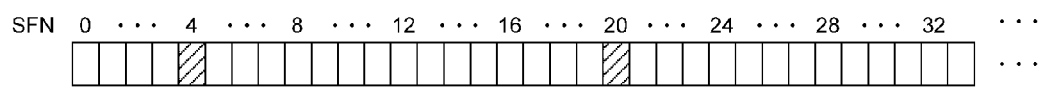
FIG. 7 is a schematic diagram 4 illustrating radio frames for carrying an MBMS control channel according to an embodiment of the present invention.

If the eNB carries the configured PmcchPeriod=16 and PmcchOffset=4 in an SIB of a system broadcast message and sends the configured PmcchPeriod=16 and PmcchOffset=4 to the terminal, then the terminal can acquire radio frames carrying an MBMS control channel (as shown by the shadow areas in FIG. 7) through analysis according to the conversion relation of SFN mod 16=4 and determines the radio frames corresponding to SFN=4, 20, 36, 52 and the like.

Figure 8:
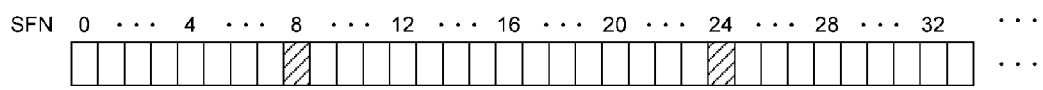
FIG. 8 is a schematic diagram 5 illustrating radio frames for carrying an MBMS control channel according to an embodiment of the present invention.

If the eNB carries the configured PmcchPeriod=16 and PmcchOffset=8 in an SIB of a system broadcast message and then sends the configured PmcchPeriod=16 and PmcchOffset=8 to the terminal, then the terminal can acquire radio frames carrying an MBMS control channel (as shown by the shadow areas in FIG. 8) through analysis according to the conversion relation of SFN mod 16=8 and determines the radio frames corresponding to SFN=8, 24, 40, 56 and the like.

In practical application, the radio frames of an MBMS control channel can be distributed in many other ways which are not enumerated herein. Furthermore, if the PmcchPeriod has been specified in a protocol, then the terminal knows certainly the value of the PmcchPeriod, the eNB no longer needs to inform the terminal of the PmcchPeriod and instead, only sends the value of the PmcchOffset to the terminal, which lowers signaling overheads.

Figure 9:
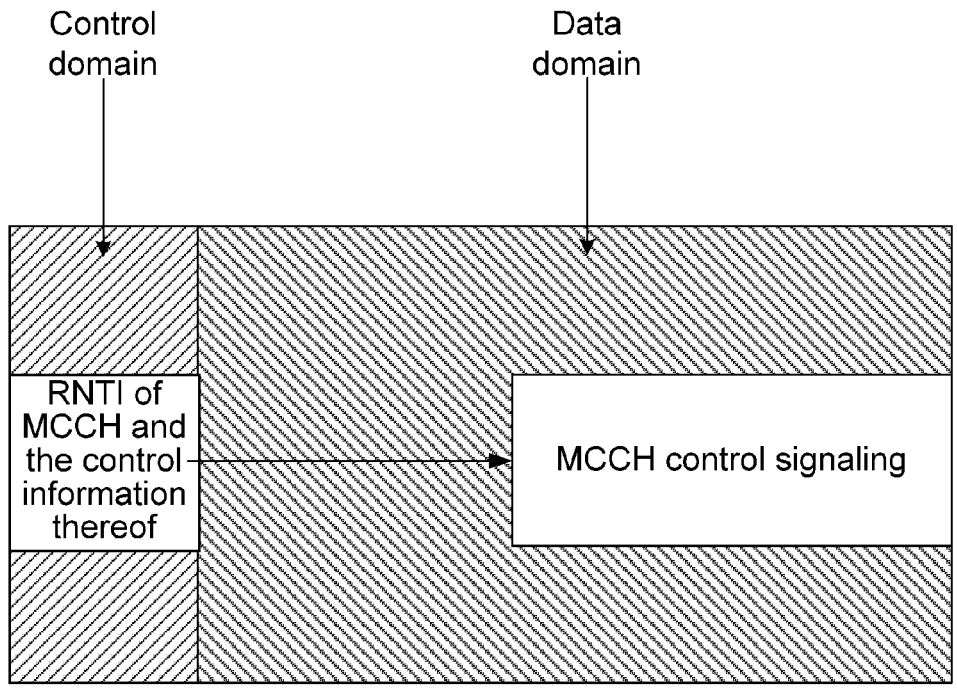
FIG. 9 is a schematic diagram illustrating the structure of a sub-frame for carrying an MBMS control channel according to an embodiment of the present invention.

Furthermore, in this embodiment, the eNB is capable of indicating the information of a sub-frame carrying an MBMS control channel to the terminal, and the terminal reads an MBMS control signaling from the corresponding sub-frame in the radio frame carrying the MBMS control channel. In principle, the MBMS control signaling can be carried on any sub-frame in an MBSFN radio frame, but actually carried according to some agreements. For instance, the agreements can be as follows: if it is agreed that an MBMS control channel can only be carried on a system-configured sub-frame of an MBSFN radio frame for carrying an MBMS, then the MBMS control channel can only be carried on the MBMS sub-frame that has been already distributed by the system. A more detailed description is shown in FIG. 9, control information containing a Radio Network Temporary Identifier (RNTI) for identifying an MBMS control channel is carried in the control domain of the sub-frame, and the MBMS control signaling is carried in the data domain of the sub-frame, wherein the RNTI of the control domain is used for helping the terminal acquire the control information of the MBMS control channel which further indicates the specific location information of the MBMS in the data domain and other information. The terminal finds the control information of the RNTI for identifying the MBMS control channel by detecting the control domain information of the sub-frame in the radio frame carrying an MBMS control channel, and then consequentially analyzes the control information of the MBMS control channel and further determines the specific location of the MBMS control channel according to the control information, and receives and analyzes the MBMS control signaling at the determined location.

In the embodiment of the present invention, the eNB indicates the information of a sub-frame carrying an MBMS control channel to the terminal in a bitmap manner, a sub-frame number indication manner or a sub-frame fixation manner.

The bitmap manner is as follows: for example, 10 bits are used for describing the sub-frames for carrying an MBMS control channel in a radio frame (as shown in FIG. 3), and the MBMS control channel is carried on the sub-frames #1 and #2 as shown in FIG. 3, then a signaling using a bitmap is '0110000000', the bits in the signaling correspond sequentially to sub-frames #0 to #9, and correspondingly, bit '1' represents the sub-frame carrying the MBMS control channel.

The sub-frame number indication manner is as follows: considering that each radio frame includes 10 sub-frames, 4 bits are required to be used for distinguishing the sub-frames carrying an MBMS control channel, for example, '0001' represents sub-frame #1 carrying an MBMS control channel, and '0010' represents sub-frame #2 carrying an MBMS control channel. As shown in FIG. 3, when the MBMS control channel is carried on the sub-frames #1 and #2, instructions '0001' and '0010' are used for informing the terminal.

The sub-frame fixation manner is as follows: it is defaulted by the eNB and the terminal that an MCCH is fixed to be carried by one or more sub-frames in a radio frame which has been designated to carry the MCCH. For instance, if the carrying is implemented by a fixed sub-frame #1, then the MCCH is carried on the sub-frame #1 in the radio frame that is designated to carry the MCCH, which saves the signaling overheads used for indicating the location of the sub-frame.

It can be seen from the embodiments above that the PmcchPeriod and the PmcchOffset are flexibly configured, thus, flexibility is provided for transmitting an MBMS control channel by the eNB, and consequentially a radio frame can be flexibly selected, which facilitates the scheduling of the eNB. However, signaling overheads should be taken into consideration in practical application, thus leading to some limitations to the selection on a radio frame for carrying an MBMS control channel.

In the embodiments of the present invention, the PmcchOffset generally can be valued to be any positive integer which is smaller than the PmcchPeriod. Yet, in practical application, in order to facilitate the sending of an MBMS control signaling and the coordination with MBMSs and to reduce signaling overheads, it can be appointed that the values of the PmcchOffset and the radioFrameAllocationOffset are the same, so that there is no need to notify the terminal of the value of the PmcchOffset because the terminal can directly know the value of the PmcchOffset via the value of the radioFrameAllocationOffset. As a consequence, although at a cost of a reduction in the flexibility of the present invention, the signaling overheads are lowered on the ground that only the PmcchPeriod is informed to the terminal via a system broadcast message and the PmcchOffset is implicitly informed via the radioFrameAllocationOffset.

Additionally, the signaling overheads can also be lowered by specifying the PmcchPeriod as a fixed value through a protocol. A correspondence may be further established between the PmcchPeriod and the radioFrameAllocationPeriod so that the PmcchPeriod can be implicitly informed via the radioFrameAllocationPeriod. For instance, there may exist a multiple relationship between the PmcchPeriod and the radioFrameAllocationPeriod (the PmcchPeriod is 4 times as long as the radioFrameAllocationPeriod), then the terminal can indirectly acquire the value of the PmcchPeriod by the radioFrameAllocationPeriod only if the radioFrameAllocationPeriod and the multiple relationship '4' are informed.

Furthermore, in an embodiment of the present invention, it can be set that an MBMS control signaling can be updated in each PmcchPeriod or after several sequential PmcchPeriods. For instance, according to the features of an MBMS and an MBMS control signaling, it can be set that the MBMS control signaling is a fixed period which is preferably to be 320 ms, 640 ms, 160 ms and the like. If it is set that an MBMS control signaling sends the same content in several sequential repetition periods and is forbidden from being updated, then the several sequential repetition periods are defined to be a modification period, and an update is only allowed when the modification period is reached. For instance, it is specified that the repetition period and the modification period of an MBMS control signaling are respectively 320 ms and 1280 ms, then the MBMS control signaling is forbidden from being updated in four sequential repetition periods. As the repetition period information of the MBMS control signaling is carried in a system broadcast message, it is preferred that the repetition period and the modification period of the control signaling on the radio frame and/or the sub-frame carrying an MBMS control channel are respectively set to be the same as those of the system broadcast message, or that the modification period of the control signaling on the radio frame and/or the sub-frame carrying an MBMS control channel is set to be the same as that of the system broadcast message, so that the information on the system broadcast message for indicating the repetition period or the modification period of the carried MBMS can change timely when the repetition period or the modification period of the control signaling on the radio frame and/or the sub-frame carrying an MBMS control channel changes.

The embodiment of carrying a control signaling on a DL-SCH is substantially identical to that of carrying a control signaling on an MCH, so no more repeated description is given here. However, the embodiment of carrying a control signaling on a DL-SCH is different in that the radio frame carrying an MBMS control channel can be a non-MBMSFN radio frame, and only the conversion relation of SFN mod PmcchPeriod=PmcchOffset is required, thus, the process of configuring SFN mod radioFrameAllocationPeriod=radioFrameAllocationOffset can be saved.

Figure 10:
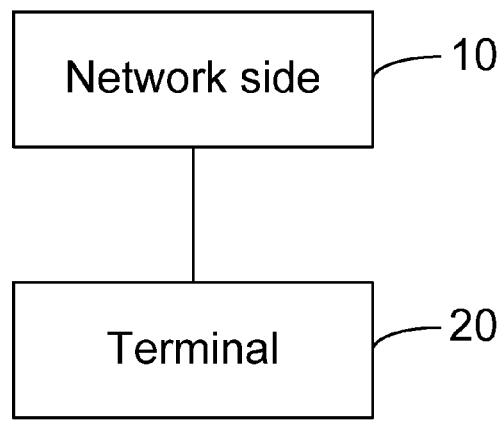
FIG. 10 is a schematic diagram illustrating the composition structure of a system for transmitting an MBMS control signaling according to the present invention.

In order to realize the aforementioned method for transmitting an MBMS control signaling, the present invention further provides a system for transmitting an MBMS control signaling, which, as shown in FIG. 10, consists of a network side 10 and a terminal 20 which are connected with each other. The network side 10 is used for sending indication information of a radio frame and/or a sub-frame carrying an MBMS control channel to the terminal 20 via a high-level signaling and sending an MBMS control signaling to the terminal 20 via the radio frame and/or the sub-frame carrying an MBMS control channel; and the terminal 20 is used for acquiring the radio frame and/or the sub-frame carrying an MBMS control channel through analysis according to the acquired indication information of the radio frame and/or the sub-frame and reading the MBMS control signaling from the radio frame and/or the sub-frame.

In the present invention, the MBMS control channel is an MCCH, a P-MCCH, an S-MCCH, an MICH or an MTCH.

The indication information of the radio frame and/or the sub-frame carrying an MBMS control channel comprises at least one of: the occurrence period information and the sending offset information of the radio frame and/or the sub-frame carrying an MBMS control channel; the sending offset information of the control signaling carried on the radio frame and/or the sub-frame of the MBMS control channel; and the repetition period information and the modification period information of the control signaling carried on the radio frame and/or the sub-frame of the MBMS control channel;

the indication information of the radio frame and/or the sub-frame carrying an MBMS control channel further comprises: an MBSFN radio frame period and an MBSFN radio frame offset.

In conclusion, the present invention eliminates the randomness in the transmission of an MBMS control signaling at a system side and the reception of an MBMS control signaling at a terminal, lowers the signaling overheads of the terminal, and facilitates the power saving of the terminal; in addition, the indication information of the radio frame and/or the sub-frame carrying an MBMS control channel can be flexibly configured, which provides the flexibility of transmitting an MBMS control signaling at a network side, moreover, the sub-frame carrying an MBMS control channel can be flexibly selected, facilitating the scheduling at the network side.

The mentioned above are only preferred embodiments of the present invention but not limitation to the protection scope of the present invention.

What is claimed is:

1. A method for transmitting a Multimedia Broadcast Multicast Service (MBMS) control signaling, comprising:
   sending indication information of a radio frame and/or a sub-frame carrying an MBMS control channel to a terminal via a high-level signaling and sending an MBMS control signaling to the terminal via the radio frame and/or sub-frame carrying an MBMS control channel by a network side; wherein the high-level signaling is a system broadcast message, a Radio Resource Control (RRC) message, or a dedicated signaling;
   and acquiring the radio frame and/or sub-frame carrying an MBMS control channel through analysis according to the acquired indication information of the radio frame and/or the sub-frame and reading the MBMS control signaling from the radio frame and/or the sub-frame by a terminal;
   wherein the indication information of the radio frame and/or the sub-frame carrying an MBMS control channel comprises occurrence period information and sending offset information of the radio frame and/or the sub-frame carrying an MBMS control channel;
   wherein the acquiring the radio frame carrying an MBMS control channel through analysis according to the indication information of the radio frame specifically comprises:
   acquiring the radio frame carrying an MBMS control channel through analysis according to the conversion relation of SFN mod PmcchPeriod=PmcchOffset; wherein the SFN represents a system frame number and is valued to be 0 or a positive integer; the PmcchPeriod represents the occurrence period information of the radio frame and/or the sub-frame carrying an MBMS control channel; the PmcchOffset represents the sending offset information of the radio frame and/ or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel refers to a radio frame corresponding to an SFN meeting the conversion relation of SFN mod PmcchPeriod=PmcchOffset.

2. The method for transmitting an MBMS control signaling according to claim 1, wherein the MBMS control channel is a Multicast Control Channel (MCCH), a Primary Multicast Control Channel (P-MCCH), a Secondary Multicast Control Channel (S-MCCH), a Multicast Indicator Channel (MICH), or a Multicast Traffic Channel (MTCH).

3. The method for transmitting an MBMS control signaling according to claim 1, wherein the indication information of the radio frame and/or the sub-frame carrying an MBMS control channel further comprises at least one of:
   sending offset information of the control signaling carried on the radio frame and/or the sub-frame of the MBMS control channel;
   repetition period information and modification period information of the control signaling carried on the radio frame and/or the sub-frame of the MBMS control channel;
   the indication information of the radio frame and/or the sub-frame carrying an MBMS control channel further comprises: an MBSFN radio frame period and an MBSFN radio frame offset.

4. The method for transmitting an MBMS control signaling according to claim 3, wherein the acquiring the radio frame carrying an MBMS control channel through analysis according to the indication information of the radio frame further comprises:
   acquiring the radio frame carrying an MBMS control channel through analysis according to the conversion relations of SFN mod PmcchPeriod=PmcchOffset and SFN mod radioFrameAllocationPeriod=radioFrameAllocation Offset;
   wherein the SFN represents a system frame number and is valued to be 0 or a positive integer; the radioFrameAllocationPeriod represents the MBSFN radio frame period; the radioFrameAllocationOffset represents the MBSFN radio frame offset and is valued to be an integer that is greater than or equal to 0 but smaller than a value of the radioFrameAllocationPeriod; the PmcchPeriod represents the occurrence period information of the radio frame and/or the sub-frame carrying an MBMS control channel and is valued to be an integer that is greater than or equal to the radioFrameAllocationPeriod; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel refers to a radio frame corresponding to an SFN synchronously meeting the two conversion relations above.

5. The method for transmitting an MBMS control signaling according to claim 3, further comprising at least one of the following steps that:
   implicitly notifying, by the network side, the terminal of the sending offset via the MBSFN radio frame offset according to a preset correspondence between the sending offset and the MBSFN radio frame offset;
   implicitly notifying, by the network side, the terminal of the repetition period via the MBSFN radio frame period according to a preset correspondence between the repetition period and the MBSFN radio frame period;
   implicitly notifying, by the network side, the terminal of the modification period via the repetition period according to a preset correspondence between the repetition period and the modification period;
   and implicitly notifying, by the network side, the terminal of the repetition period via the modification period according to a preset correspondence between the repetition period and the modification period.

6. The method for transmitting an MBMS control signaling according to claim 1, wherein the sending indication information of a radio frame and/or a sub-frame carrying an MBMS control channel to a terminal by a network side via a high-level signaling is:
   based on notifying the terminal of information of the radio frame carrying an MBMS control channel via a high-level signaling, the network side further indicates information of a sub-frame which specifically carries the MBMS control channel in the radio frame carrying the MBMS control channel to the terminal in a bitmap manner, a sub-frame number indication manner or a sub-frame fixation manner via the high-level signaling.

7. A method for transmitting an MBMS control signaling, comprising:
   sending indication information of a radio frame and/or a sub-frame carrying an MBMS control channel to a terminal via a high-level signaling and sending an MBMS control signaling to the terminal via the radio frame and/or the sub-frame carrying an MBMS control channel by a network side; wherein the high-level signaling is a system broadcast message, an RRC message, or a dedicated signaling; wherein the indication information of the radio frame and/or the sub-frame carrying an MBMS control channel comprises occurrence period information and sending offset information of the radio frame and/or the sub-frame carrying an MBMS control channel;
   and the method further comprising: determining, by the network side, the radio frame carrying an MBMS control channel according to the indication information of the radio frame, which specifically comprises:
   determining the radio frame carrying an MBMS control channel according to the conversion relation of SFN mod PmcchPeriod=PmcchOffset; wherein the SFN represents a system frame number and is valued to 0 or be a positive integer; the PmcchPeriod represents the occurrence period information of the radio frame and/or the sub-frame carrying an MBMS control channel; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel refers to a radio frame corresponding to an SFN meeting the conversion relation of SFN mod PmcchPeriod=PmcchOffset.

8. The method for transmitting an MBMS control signaling according to claim 7, wherein the MBMS control channel is an MCCH, a P-MCCH, an S-MCCH, an MICH or an MTCH.

9. The method for transmitting an MBMS control signaling according to claim 7, wherein the indication information of the radio frame and/or the sub-frame carrying an MBMS control channel further comprises at least one of:

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel further comprises: an MBSFN radio frame period and an MBSFN radio frame offset.

10. The method for transmitting an MBMS control signaling according to claim 9, further comprising at least one of the following steps that:

implicitly notifying, by the network side, the terminal of the sending offset via the MBSFN radio frame offset according to a preset correspondence between the sending offset and the MBSFN radio frame offset;

implicitly notifying, by the network side, the terminal of the repetition period via the MBSFN radio frame period according to a preset correspondence between the repetition period and the MBSFN radio frame period;

implicitly notifying, by the network side, the terminal of the modification period via the repetition period according to a preset correspondence between the repetition period and the modification period;

and implicitly notifying, by the network side, the terminal of the repetition period via the modification period according to a preset correspondence between the repetition period and the modification period.

11. The method for transmitting an MBMS control signaling according to claim 7, wherein the sending indication information of a radio frame and/or a sub-frame carrying an MBMS control channel to a terminal by a network side via a high-level signaling is:

based on notifying the terminal of information of the radio frame carrying an MBMS control channel via a high-level signaling, the network side further indicates information of a sub-frame which specifically carries the MBMS control channel in the radio frame carrying the MBMS control channel to the terminal in a bitmap manner, a sub-frames number indication manner or a sub-frame fixation manner via the high-level signaling.

12. A method for transmitting an MBMS control signaling, comprising:

acquiring indication information of a radio frame and/or a sub-frame carrying an MBMS control channel from a network side by a terminal via a high-level signaling;

wherein the high-level signaling is a system broadcast message, a Radio Resource Control (RRC) message, or a dedicated signaling; and acquiring the radio frame and/or the sub-frame carrying an MBMS control channel through analysis according to the acquired indication information of the radio frame and/or the sub-frame and reading an MBMS control signaling from the radio frame and/or the sub-frame by the terminal;

wherein the indication information of the radio frame and/or the sub-frame carrying an MBMS control channel comprises occurrence period information and sending offset information of the radio frame and/or the sub-frame carrying an MBMS control channel;

wherein the acquiring the radio frame carrying an MBMS control channel through analysis according to the indication information of the radio frame specifically comprises:

acquiring the radio frame carrying an MBMS control channel through analysis according to the conversion relation of SFN mod PmcchPeriod=PmcchOffset; wherein the SFN represents a system frame number and is valued to be 0 or a positive integer; the PmcchPeriod represents the occurrence period information of the radio frame and/or the sub-frame carrying an MBMS control channel; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel refers to a radio frame corresponding to an SFN meeting the conversion relation of SFN mod PmcchPeriod=PmcchOffset.

13. The method for transmitting an MBMS control signaling according to claim 12, wherein the MBMS control channel is an MCCH, a P-MCCH, an S-MCCH, an MICH or an MTCH.

14. The method for transmitting an MBMS control signaling according to claim 12, wherein the indication information of the radio frame and/or the sub-frame carrying an MBMS control channel further comprises at least one of:

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel further comprises: an MBSFN radio frame period and an MBSFN radio frame offset.

15. The method for transmitting an MBMS control signaling according to claim 14, wherein the acquiring the radio frame carrying an MBMS control channel through analysis according to the indication information of the radio frame further comprises:

acquiring the radio frame carrying an MBMS control channel through analysis according to the conversion relations of SFN mod PmcchPeriod=PmcchOffset and SFN mod radioFrameAllocationPeriod=radioFrameAllocationOffset; wherein the SFN represents a system frame number and is valued to be 0 or a positive integer; the radioFrameAllocationPeriod represents the MBSFN radio frame period; the radioFrameAllocationOffset represents the MBSFN radio frame offset and is valued to be an integer that is greater than or equal to 0 but smaller than a value of the radioFrameAllocationPeriod; the PmcchPeriod represents the occurrence period information of the radio frame and/or the sub-frame carrying an MBMS control channel and is valued to be an integer that is greater than or equal to the radioFrameAllocationPeriod; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel is a radio frame corresponding to an SFN synchronously meeting the two conversion relations above.

16. A system for transmitting an MBMS control signaling, comprising a network side and a terminal which are connected with each other, wherein the network side is used for sending indication information of a radio frame and/or a sub-frame carrying an MBMS control channel to a terminal via a high-level signaling and sending an MBMS control signaling to the terminal via the radio frame and/or the sub-frame carrying an MBMS control channel; wherein the high-level signaling is a system broadcast message, a Radio Resource Control (RRC) message, or a dedicated signaling;

and the terminal is used for acquiring the radio frame and/or the sub-frame carrying an MBMS control channel through analysis according to the acquired indication information of the radio frame and/or the sub-frame and reading the MBMS control signaling from the radio frame and/or the sub-frame;

wherein the indication information of the radio frame and/or the sub-frame carrying an MBMS control channel comprises occurrence period information and sending offset information of the radio frame and/or the sub-frame carrying an MBMS control channel;

wherein the terminal is further used for acquiring the radio frame carrying an MBMS control channel through analysis according to the conversion relation of SFN mod PmcchPeriod=PmcchOffset; wherein the SFN represents a system frame number and is valued to be 0 or a positive integer; the PmcchPeriod represents the occurrence period information of the radio frame and/or the sub-frame carrying an MBMS control channel; the PmcchOffset represents the sending offset information of the radio frame and/or the sub-frame carrying an MBMS control channel and is valued, relative to a radio frame with SFN=0, to be 0 or a positive integer smaller than the PmcchPeriod; the mod represents a modulus operation; and the radio frame carrying an MBMS control channel refers to a radio frame corresponding to an SFN meeting the conversion relation of SFN mod PmcchPeriod=PmcchOffset.

17. The system for transmitting an MBMS control signaling according to claim 16, wherein the MBMS control channel is an MCCH, a P-MCCH, an S-MCCH, an MICH or an MTCH.

18. The system for transmitting an MBMS control signaling according to claim 16, wherein the indication information of the radio frame and/or the sub-frame carrying an MBMS control channel further comprises at least one of:

sending offset information of the control signaling carried on the radio frame and/or the sub-frame of the MBMS control channel;

repetition period information and modification period information of the control signaling carried on the radio frame and/or the sub-frame of the MBMS control channel;

the indication information of the radio frame and/or the sub-frame carrying an MBMS control channel further comprises: an MBSFN radio frame period and an MBSFN radio frame offset.

* * * * *